S. REESE.
ANIMAL TRAP.
APPLICATION FILED MAR. 10, 1917.
1,239,722.
Patented Sept. 11, 1917.
2 SHEETS—SHEET 1.
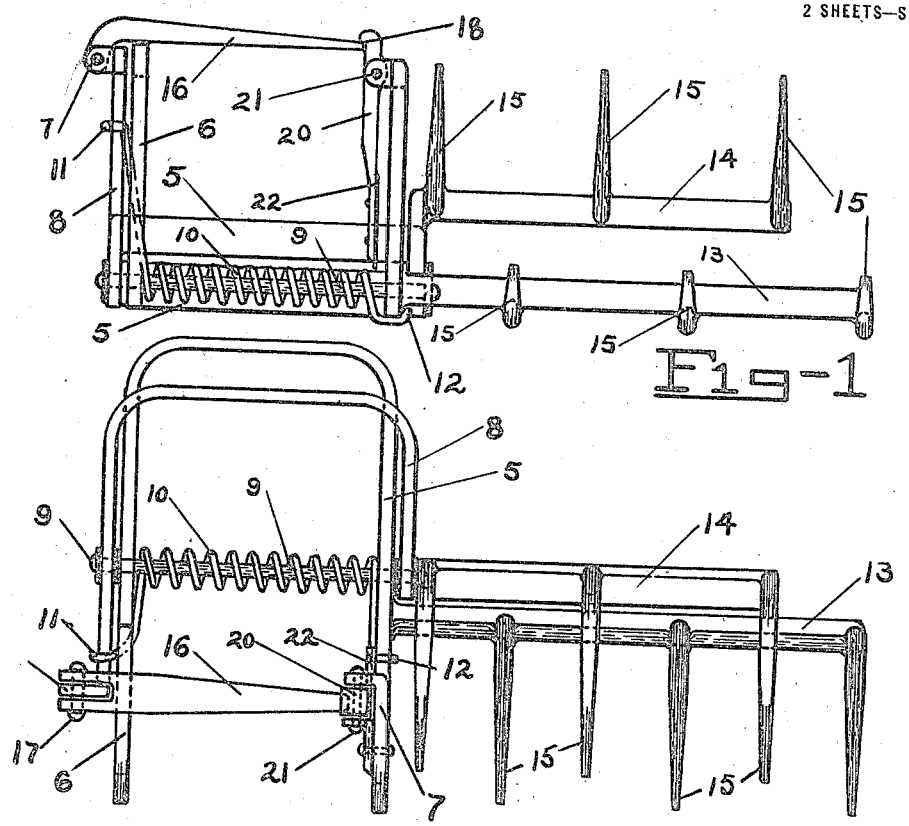
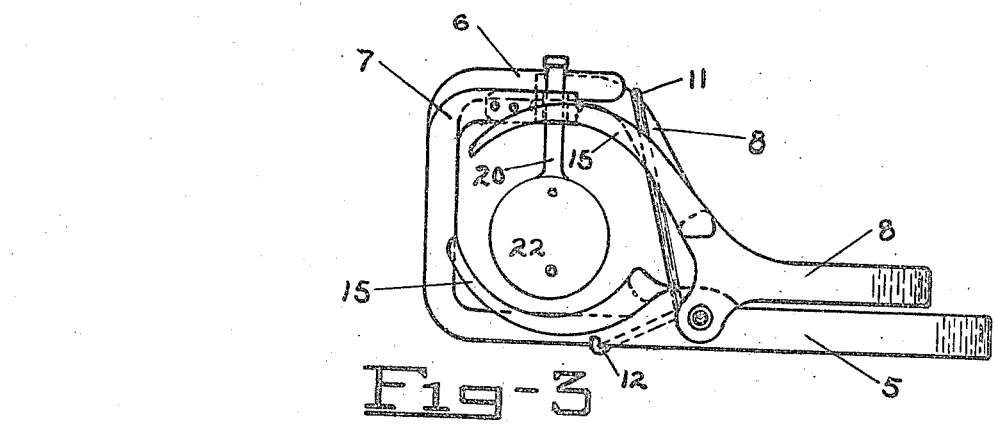
WITNESSES:
F. C. Matheny
W. W. Boulton
INVENTOR
STEPHEN REESE
BY
Cook & Matheny
ATTORNEY

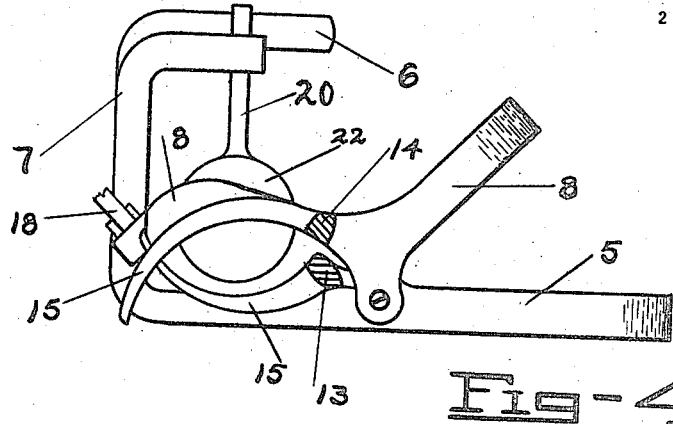
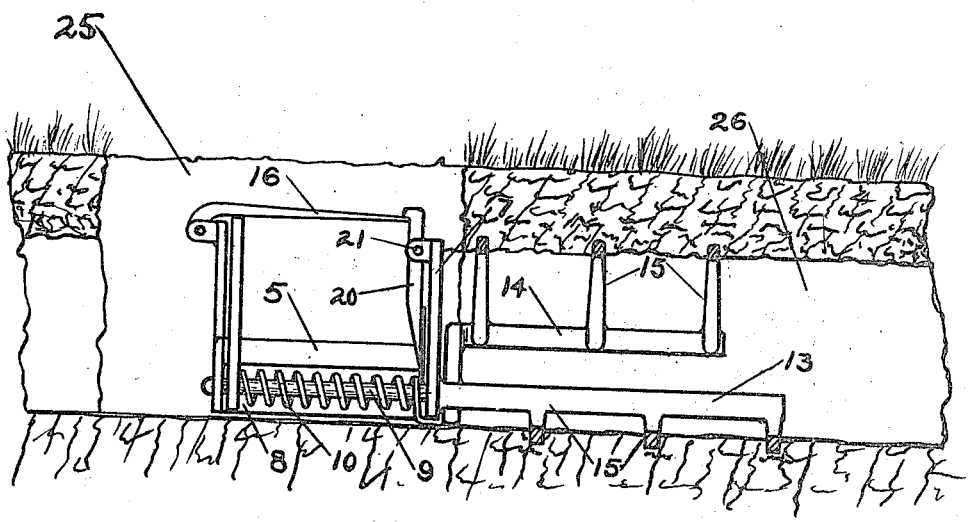

UNITED STATES PATENT OFFICE.

STEPHEN REESE, OF SUMNER, WASHINGTON.

ANIMAL-TRAP.

1,239,722.     Specification of Letters Patent.     Patented Sept. 11, 1917.

Application filed March 10, 1917. Serial No. 154,053.

*To all whom it may concern:*

Be it known that I, STEPHEN REESE, a citizen of the United States, residing at Sumner, in the county of Pierce and State of Washington, have invented a new and useful Improvement in Animal-Traps, of which the following is a specification.

This invention relates to improvements in animal traps and more particularly to improvements in traps that are adapted for catching small animals that burrow in the ground as moles and the like.

The object of this improvement is to provide a trap having jaws that may be inserted within an underground runway in such manner that a mole or like animal will be within the jaws of the trap before it approaches the trip mechanism.

A further object is to provide a trap that does not block the runway or hole in which it is set.

The invention consists in the novel construction adaptation and combination of parts as will be more clearly hereinafter described and claimed.

In trapping moles it is customary to dig a hole that intersects the burrow or runway of the mole and to set the trap in this hole so that the mole will come in contact with and be caught by the trap when it passes through the hole that intersects the runway. This method is often unsuccessful for the reason that the mole will not pass through the portion of the hole that has been dug down but will dig its way around the trap. My trap obviates this difficulty by providing a trap having jaws that may be set within the mole's runway and a trip that will be released if the mole tries to dig around.

In the drawings Figure 1 is a view in front elevation of the trap as it appears when it is set; Fig. 2 is a plan view of the same; Fig. 3 is a view in end elevation of the trap on broken line 3, 3 of Fig. 1; Fig. 4 is a view similar to Fig. 3 showing the position of the trap after it has been sprung and Fig. 5 is a somewhat diagrammatic view on a reduced scale of the trap as it may appear when it is inserted in the burrow or runway of a mole.

Referring to the drawings throughout which like reference numerals indicate like parts the numeral 5 indicates a frame member having somewhat the shape of a letter U when viewed from the top or bottom.

The forward ends of the member 5 are each turned upward and rearward as indicated at 6 and 7 to form trip supporting devices.

8 is a frame member that is secured to the member 5 by a pivot 9 that extends crosswise of both of such members and forms a support about which a spring 10 is wound one end of the spring being hooked over the frame member 8 as shown at 11 and the other end of such spring being hooked under one side of the frame piece 5 as shown at 12 so that the frame pieces 5 and 8 are urged together by the torsion of the spring.

13 is a jaw holding member that is secured to, or formed integral with, the frame piece 5 and extends outwardly to one side thereof and 14 is a similar jaw holding member that is secured to or formed integral with the frame member 8 and extends outwardly therefrom parallel with the member 5.

The members 13 and 14 are each provided at frequent intervals with jaw members 15 that are curved to fit the inside of a circular runway when the trap is set and are offset with respect to each other so that when the trap is sprung they will close about the body of the animal that springs the trap and hold such animal securely.

The trip mechanism consists in a trip arm 16 pivoted as at 17 to one side of the frame member 8 and adapted, when the trap is set, to extend over the rearwardly projecting portion 6 of the frame member 5 and have its end engaged and held by a hook 18 on the top of a trip lever 20 that is pivoted as at 21 to the frame member 7 and is provided on its bottom end with a plate 22 as shown in Fig. 3 that is disposed in the line of the runway through which the animal must pass and at the end of the trap adjacent the jaws 15.

When the trap is sprung the various parts are held in the positions shown in Fig. 4 by the spring 10. When the trap is to be set a hole 25 is dug down as shown in Fig. 5 until it intersects the runway 26 through which it is known that the mole will pass. The trap is then placed in the hole 25, the jaws are pushed back into the hole 26 the foot is placed on the rearwardly projecting part of the frame member 8 and the jaws are opened against the pressure of the spring 10 and against the sides of the runway 26. The trip bar is then placed in the engaged position as shown in Fig. 1, the hole 25 is covered to exclude the light and the trap is left in readiness to catch an approaching mole.

When the jaw members 15 are expanded within the runway 26 they will usually bury themselves in the earthen sides of the runway and thus be less liable to frighten an approaching animal.

If desired the jaws of the trap may be opened before the trap is placed in the hole 25 and runway 26.

When the mole approaches the trap it will be within the jaws of the trap before it encounters the trip and the trip being very lightly engaged with the trip arm will be easily released if the mole endeavors to get around it or dig around in any way. When the trip is released the spring 10 will close the jaws 15 on the mole. The spring 10 may be made heavy enough so that the animal will be killed almost instantly when the jaws close on it.

It will be noted from Fig. 3 that the trap does not block the runway 26 and that the trip plate 22 is practically the only part of the trap that is interposed in the runway.

In practice it will be customary to set two of the traps in each hole so that the jaws will project in both directions into the runways and moles approaching from either direction will be caught.

The use of this trap is not limited to the catching of moles but it may also be used for catching gophers, prairie dogs, ground squirrels and the like if desired.

It is obvious that changes in the form of construction of the several parts of this trap may be resorted to within the scope of the appended claims.

What I claim and desire to protect by Letters Patent is:

1. A trap of the class described comprising a U shaped base frame member having forward ends that are curved upwardly and rearwardly to leave an open passageway therethrough, trip mechanism disposed in said passageway, a laterally projecting arm on one side of said base frame, curved jaw members on said arm, an upper frame member pivoted to said base frame, a spring on said two frame members, a laterally projecting arm on said upper frame member and curved jaw members on said arm to coact with said first named jaw members and hold an animal.

2. A trap of the class described comprising a U shaped frame member having its forward ends bent upwardly and rearwardly to leave an open passageway therethrough, a trip lever pivoted to one of said rearwardly extending ends and disposed to hang in a vertical position with its lower end in said open passageway, another frame member pivoted to said first named member and having one side that extends upwardly and forwardly from said pivot, a trip arm pivoted to said forwardly extending portion of said last named frame member said trip arm being adapted to rest upon one of said rearwardly extending ends of said first named frame member and engage with said trip lever when said trap is set, a spring connected with said two frame members, an extension on said last named frame member projecting rearwardly from said pivot whereby said trap may be set, arms projecting sidewise from each of said frame members in substantially parallel relation, and curved jaws on said arms.

Signed by me at Sumner, Washington, this 23d day of February, 1917.

STEPHEN REESE.

Witnesses:
J. W. PAGE,
HENRY WILLIAMS.

Copies of this patent may be obtained for five cents each, by addressing the "Commissioner of Patents, Washington, D. C."